US012686564B2

(12) United States Patent (10) Patent No.: US 12,686,564 B2

Senger et al. (45) Date of Patent: Jul. 21, 2026

(54) AIR TABLE CONVEYOR

(71) Applicant: A. G. Stacker Inc., Weyers Cave, VA (US)

(72) Inventors: Randall Donn Senger, Mount Sidney, VA (US); Jerry Blosser, Crimora, VA (US); Joseph Wunder, Lexington, VA (US); Kennedy Sullivan Larramore, Staunton, VA (US)

(73) Assignee: A. G. Stacker Inc., Weyers Cave, VA (US)

( * ) Notice: Subject to any disclaimer, the term of this patent is extended or adjusted under 35 U.S.C. 154(b) by 115 days.

(21) Appl. No.: 18/817,314

(22) Filed: Aug. 28, 2024

(65) Prior Publication Data

US 2026/0062222 A1 Mar. 5, 2026

(51) Int. Cl.
| | |
|---|---|
| *B65G 15/28* | (2006.01) |
| *B65G 15/62* | (2006.01) |
| *B65G 41/00* | (2006.01) |

(52) U.S. Cl.
CPC ............. *B65G 15/28* (2013.01); *B65G 15/62* (2013.01); *B65G 41/002* (2013.01); *B65G 41/007* (2013.01); *B65G 2812/16* (2013.01)

(58) Field of Classification Search
CPC ...... B65G 15/28; B65G 15/62; B65G 41/002; B65G 41/007; B65G 2812/16
See application file for complete search history.

(56) References Cited

U.S. PATENT DOCUMENTS

| | | | | | |
|---|---|---|---|---|---|
| 3,052,339 | A | * | 9/1962 | Carter | B65G 37/00 |
| | | | | | 83/402 |
| 3,448,857 | A | * | 6/1969 | Falconer | B03C 1/247 |
| | | | | | 209/212 |
| 3,756,380 | A | * | 9/1973 | Ackroyd | B65G 15/42 |
| | | | | | 198/811 |
| 4,137,156 | A | * | 1/1979 | Morey | B03C 1/253 |
| | | | | | 209/227 |

FOREIGN PATENT DOCUMENTS

| | | | | | |
|---|---|---|---|---|---|
| DE | 102009046133 | A1 | * | 5/2011 | B65G 19/303 |
| WO | WO-2013161376 | A1 | * | 10/2013 | H10P 72/36 |

OTHER PUBLICATIONS

JP 5-116732 (Year: 1993).*
DE 20 2005 016 331 (Year: 2023).*

* cited by examiner

*Primary Examiner* — Mark A Deuble
(74) *Attorney, Agent, or Firm* — J-TEK LAW PLLC; Jeffrey D. Tekanic; Scott T. Wakeman

(57) ABSTRACT
A conveyor includes a platform that has an upper surface with a plurality of holes in fluid communication with at least one air passage inside the platform. The conveyor includes a belt having an upper run supported by the upper surface of the platform and a lower run extending beneath the first platform, and the belt has a plurality of through openings overlying the holes such that pressurized air exiting the at least one air passage through the holes passes through the through openings in the belt. The conveyor includes a belt driven by a drive and a blower in fluid communication with the at least one air passage that is configured to blow air into the at least one air passage to maintain a pressure in the at least one air passage at a level above an ambient atmospheric pressure.

18 Claims, 15 Drawing Sheets

AIR TABLE CONVEYOR

TECHNOLOGICAL FIELD

The present disclosure is directed to a material handling device that combines the functions of an air table and a conveyor.

BACKGROUND

Conveyors are commonly used to transport objects from one location to another. A conveyor, or a conveyor section than can be combined with additional conveyor sections to form a longer conveyor, typically includes one or more belts supported between end rollers, at least one of which is powered, to cause the one or more belts to travel around the end rollers such than an upper or support surface of the one or more belts moves in a first direction and the lower or return surface of the one or more belts moves in a second direction opposite the first direction. In some cases the end rollers are cylindrical and directly contact the one or more belts. In other cases, the end rollers are formed from shafts that support a plurality of wheels or sprockets that engage the one or more belts.

An air table is a device that emits jets of air from a horizontal surface in order to support an object located on the air table on a thin cushion of air. A common example of an air table is an air hockey game that uses jets of air to support a puck on a playing surface so that the puck moves in an essentially frictionless manner in any direction over the surface. Commercial air tables function in a similar manner to support loads, especially those having a relatively large bottom surface and a relative low overall weight. An air table may be placed at the end of a conveyor for receiving objects transported to the air table by a conveyor. For example, a conveyor may discharge loads onto an air table at which point a human operator can slide the load along the air table to a final destination at one side or the other of the air table or perform some other operation on the load which requires the load to be rotated or shifted by the operator. The greatly reduced friction provided by the air table makes the load easier for the operator to move.

The above-described load handing devices function well for their intended purposes; however, improvements thereto are still possible.

SUMMARY

It is an aspect of the present disclosure to provide an improved conveying device that combines the functions of a conveyor and an air table. This allows the conveying device to be used in a first mode as a conveyor and in a second mode as an air table and in a third mode as a combined conveyor/air table.

Another aspect of the disclosure comprises a conveyor including a frame. A first platform is mounted on the frame and has an upper surface with a plurality of first holes. Each of the plurality of first holes is in fluid communication with at least one air passage inside the first platform. A first belt has an upper run supported by the upper surface of the first platform and a lower run extending beneath the first platform. The first belt has a plurality of through openings overlying the first holes such that pressurized air exiting the at least one air passage through the first holes passes through the through openings in the first belt. The conveyor includes a drive for selectively causing the upper run of the first belt to travel along the upper surface of the first platform in a first direction and a blower in fluid communication with the at least one air passage that is configured to blow air into the at least one air passage to maintain a pressure in the at least one air passage at a level above an ambient atmospheric pressure.

DETAILED DESCRIPTION

Figure 1:
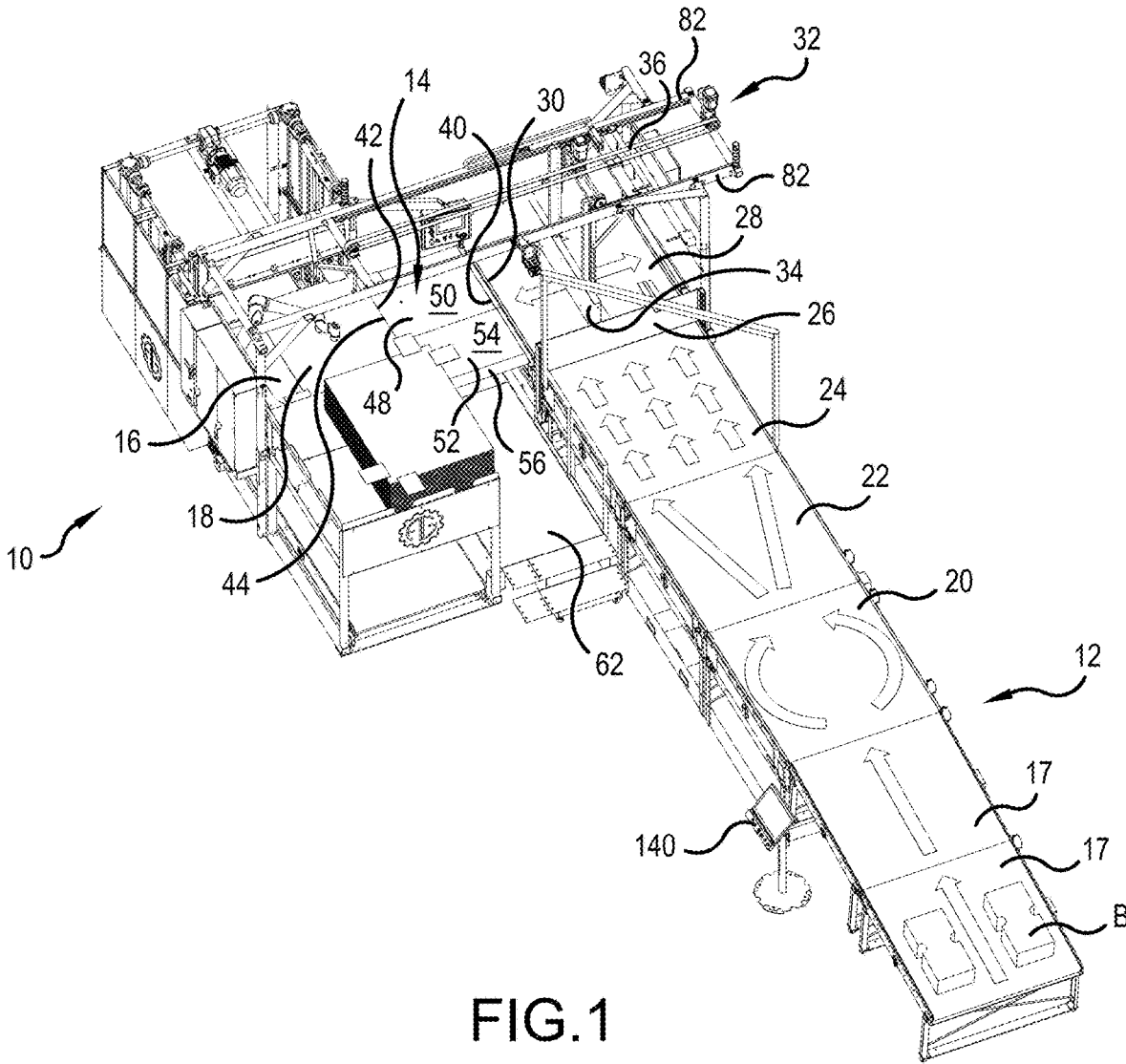
FIG. 1 is a perspective view of a first embodiment of a load forming system having a feed conveyor, a transfer platform and a load former in which system an air table conveyor according to an embodiment of the present disclosure can be used as the transfer platform.

Referring now to the drawings, wherein the showings are for purposes of illustrating presently preferred embodiments of the invention only and not for the purpose of limiting same, FIG. 1 shows a load forming system 10 that includes a feed conveyor 12, a transfer platform 14 and a load former 16 having a retractable cookie sheet 18. A direction along the feed conveyor 12 toward the load former 16 is referred to herein as a "downstream" direction.

The feed conveyor 12 is formed from a plurality of conveyor sections including two linear transport conveyor sections 17, a rotating conveyor section 20, a spreading conveyor section 22 and an accumulating conveyor section 24. The conveyor sections are operable to shift and/or rotate individual bundles B (or small groups of bundles B) so that the bundles B arrive at the accumulating conveyor section 24 in a predetermined pattern that is suitable for placement onto the cookie sheet 18 of the load former 16 in the predetermined pattern. A gate 26, shown in a raised position in FIG. 1, stops further downstream movement of bundles B on the feed conveyor 12 and causes incoming bundles B to accumulate on the accumulating conveyor section 24 at the gate 26.

When the gate 26 is lowered, the bundles B, now arranged in a predetermined pattern, are moved onto an end conveyor 28 having a discharge edge 30. A shifter 32, including a contact body 34 and an actuating mechanism 36, discussed in more detail below, pushes the bundles B off the discharge edge 30 of the end conveyor 28 and over a first edge 40 of the transfer platform 14 onto the transfer platform 14 itself. Continued movement of the contact body 34 pushes the bundles over a second edge 42 of the transfer platform 14 and over an input edge 44 of the cookie sheet 18 onto the cookie sheet 18 itself. The shifter 32 then retracts the contact body, and the load former 16 cycles to process the layer of bundles in substantially the same manner as if a worker had placed the bundles individually onto the cookie sheet 18 in a conventional manner.

Figure 2:
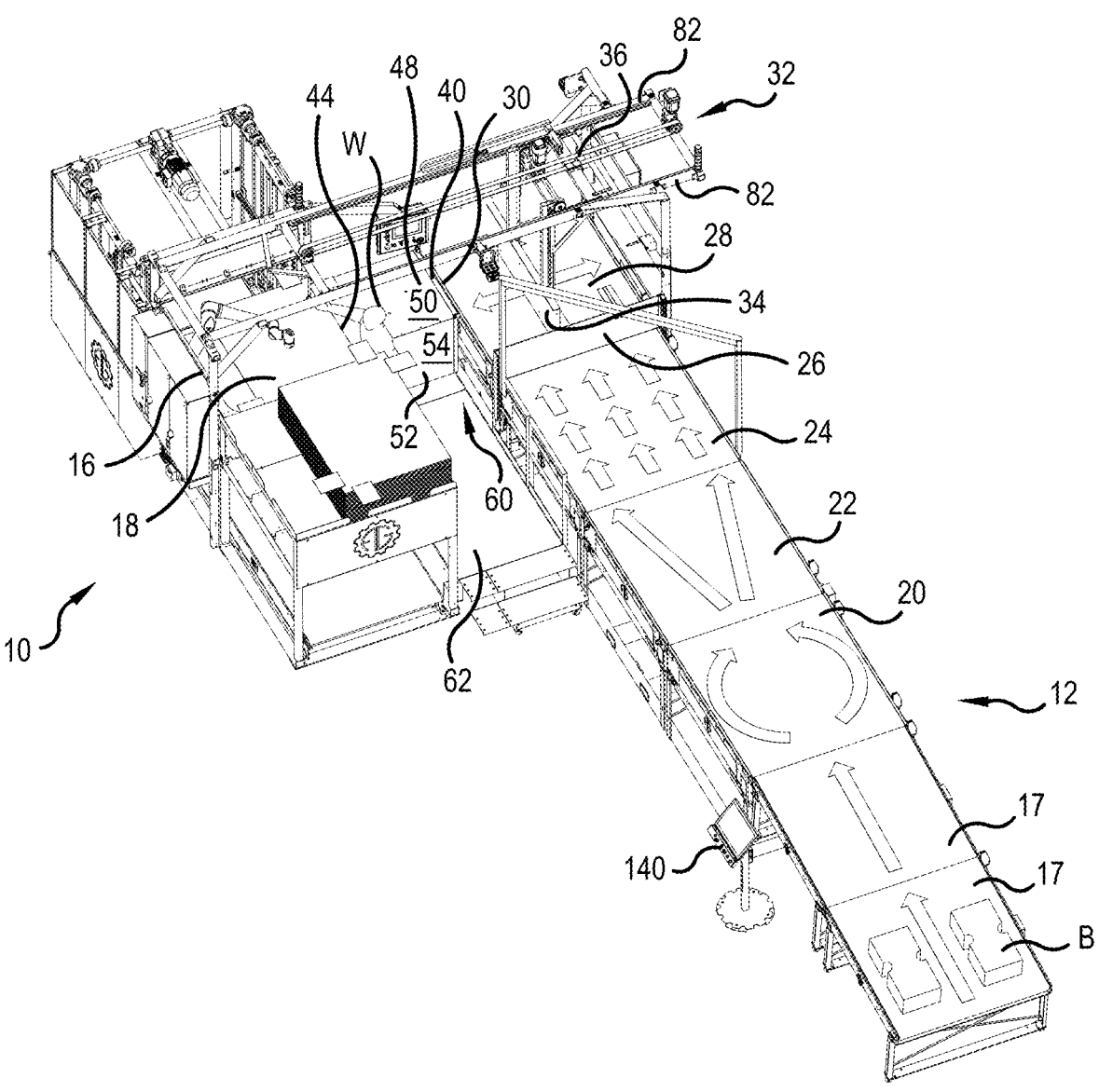
FIG. 2 is a perspective view of the load forming system of FIG. 1 configured for worker-assisted operation.

The transfer platform 14 has a first section 48 having a upper surface 50 and a second section 52 having an upper surface 54 hingedly connected to the first section 48 such that the second section 52 is shiftable between a first position, shown in FIG. 1, in which the upper surface 50 of the first section 48 and the upper surface 54 of the second section 52 are substantially coplanar, and a second position, shown in FIG. 2, in which the second section 52 is lowered such that the upper surface 54 of the second section 52 is substantially perpendicular to the upper surface 50 of the first section 48. When the second section 52 is in the first position, a guard 56 is mounted at the free end 58 of the second section 52 to help guide bundles across the transfer platform 14.

The upper surfaces 50, 54 of the first and second sections 48, 52 are smooth to facilitate the sliding movement of bundles thereacross. The upper surface 48 may be formed from, for example, stainless steel. Alternately, to reduce friction, the first section 48 and/or second section 52 of the transfer platform 14 may comprise an air table which emits jets of air from an internal pressurized plenum reduce the weight of the bundles B against the upper surfaces 50 (and optionally 54) to allow the bundles B to be moved across the transfer platform 14 with less frictional resistance. As a further alternative, the transfer platform 14 may be formed as an air-table conveyor 210 discussed in greater detail hereinafter.

FIG. 2 shows the second section 52 of the transfer platform 14 in the second position. When the second section 52 is in the second position, the load forming system 10 is configured to allow a worker W to manually shift bundles B from the end conveyor 28 to the cookie sheet 18 of the load former 16. To accommodate the worker W, a workspace 60 extends to a location between the end conveyor 28 and the load former 16. The workspace 60 is bounded on its bottom side by a worker platform 62, on a first side by the upper surface 54 of the second platform 52 in the second position, on a second side by the front of the load former 16 and on a third side by a portion of the end conveyor 28. Notably, a portion of the workspace 60 is located between the contact body 34 of the shifter 32 and the load former 16 in a location that is inaccessible to the worker W due to the presence of the guard 56 when the load forming system 10 is configured for automated operation. However, the guard 56 is configured to be readily removed or repositioned in manner that allows the worker W access to the full workspace 60 when the load forming system 10 is configured for semi-automatic operation with a worker W.

The worker W standing in the workspace 60 can manually remove individual bundles B from the end conveyor 28, slide the bundles B over the upper surface 50 of the first section 48 of the transfer platform 14 and place the bundles B onto the cookie sheet 18 of the load former 16 in a desired orientation. When the load forming system 10 is operated in this semi-automatic manner, bundles B may arrive at the end conveyor 28 one at a time rather than in a prearranged pattern suitable for sliding as a unit onto the load former 16. That is, the worker W and not the various sections of the feed conveyor 12 will arrange the bundles in a desired pattern on the cookie sheet 18.

Importantly, operation of the shifter 32 is enabled in the automated system configuration of FIG. 1 and disabled in the worker-assisted configuration of FIG. 2. This is because in the worker-assisted configuration, a worker W must stand between the contact body 34 and the load former 16 and could be injured by movement of the contact body 34 if it moves. The disabling may be carried out by a controller 140 or by a pin or other physical structure securing the contact body 34 or part of the shifter 32 to a fixed structure in a manner that prevents movement of the contact body 34. For example, a sensor (not illustrated) may monitor for the presence of the guard 56, and the controller 140 may keep the shifter in the disabled state at all times when the guard 56 is not present. The controller 140 may comprise, for example, a microprocessor or a computer processor having a CPU, an application-specific integrated circuit (ASIC), an integrated circuit (IC), or a suitably programmed general purpose computer.

Figure 3:
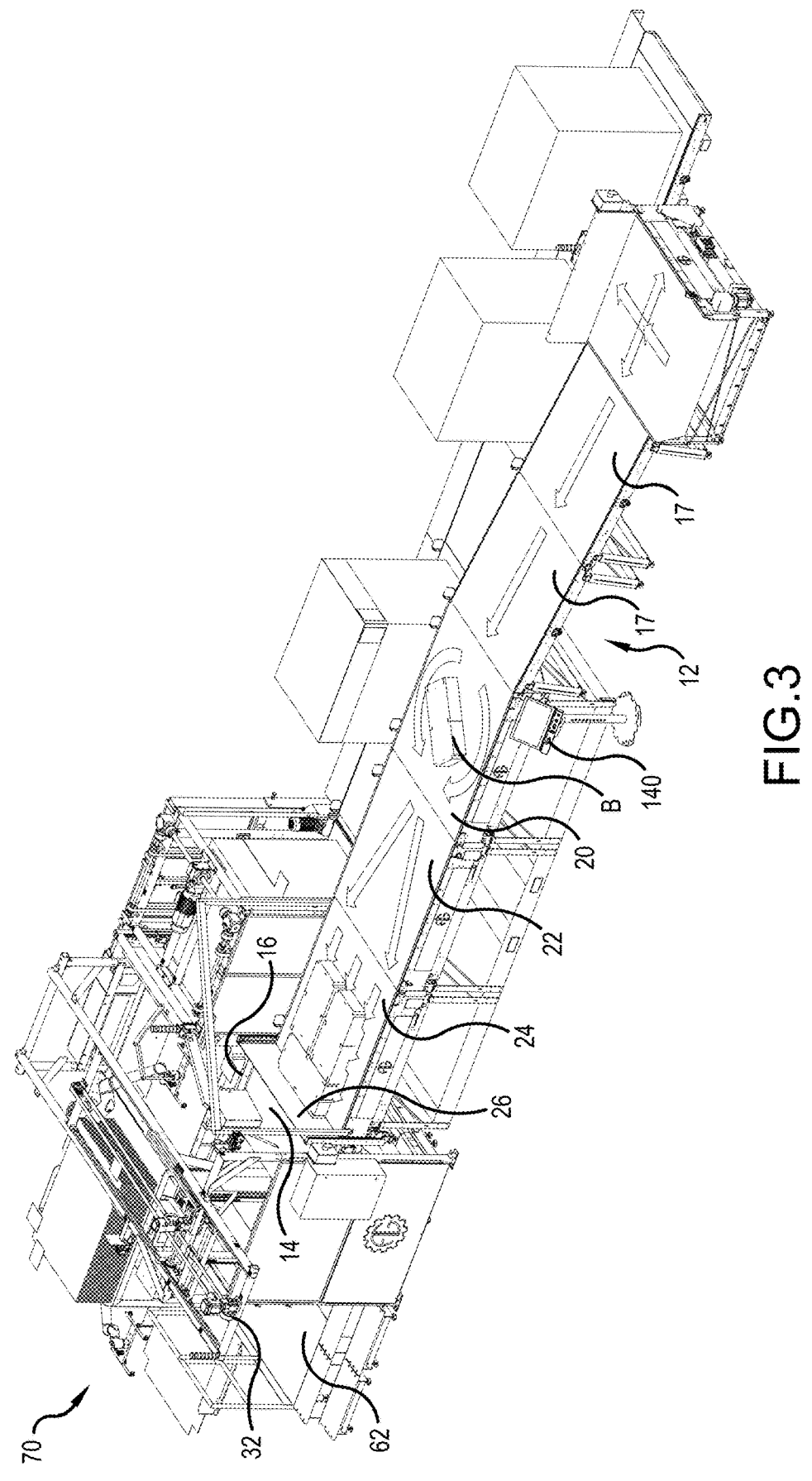
FIG. 3 is a perspective view of a second embodiment of a load forming system having a feed conveyor, a transfer platform and a load former in which system an air table conveyor according to an embodiment of the present disclosure can be used as the transfer platform.
Figure 4:
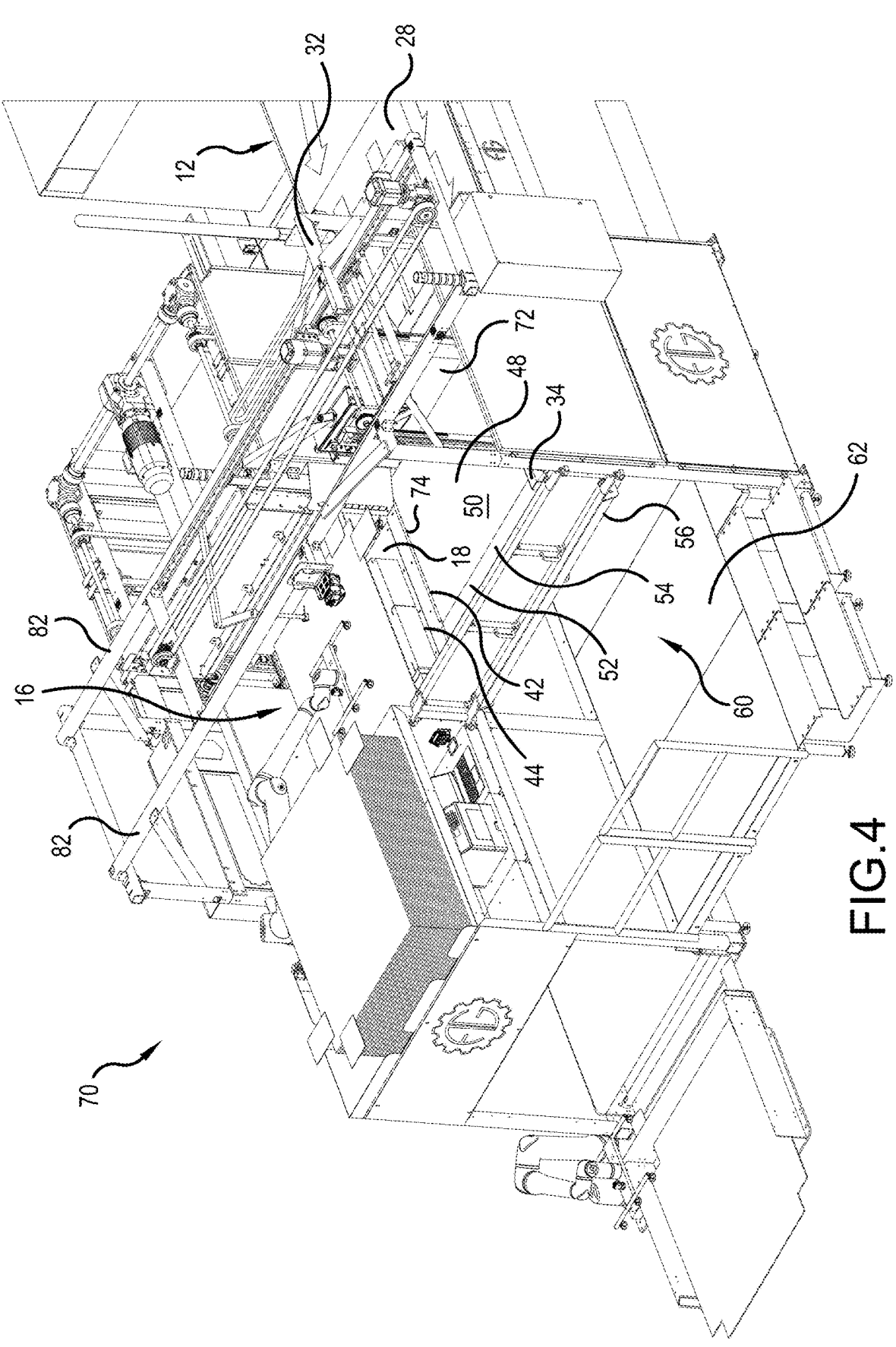
FIG. 4 is a perspective view of the load forming system of FIG. 3 configured for automated operation.
Figure 5:
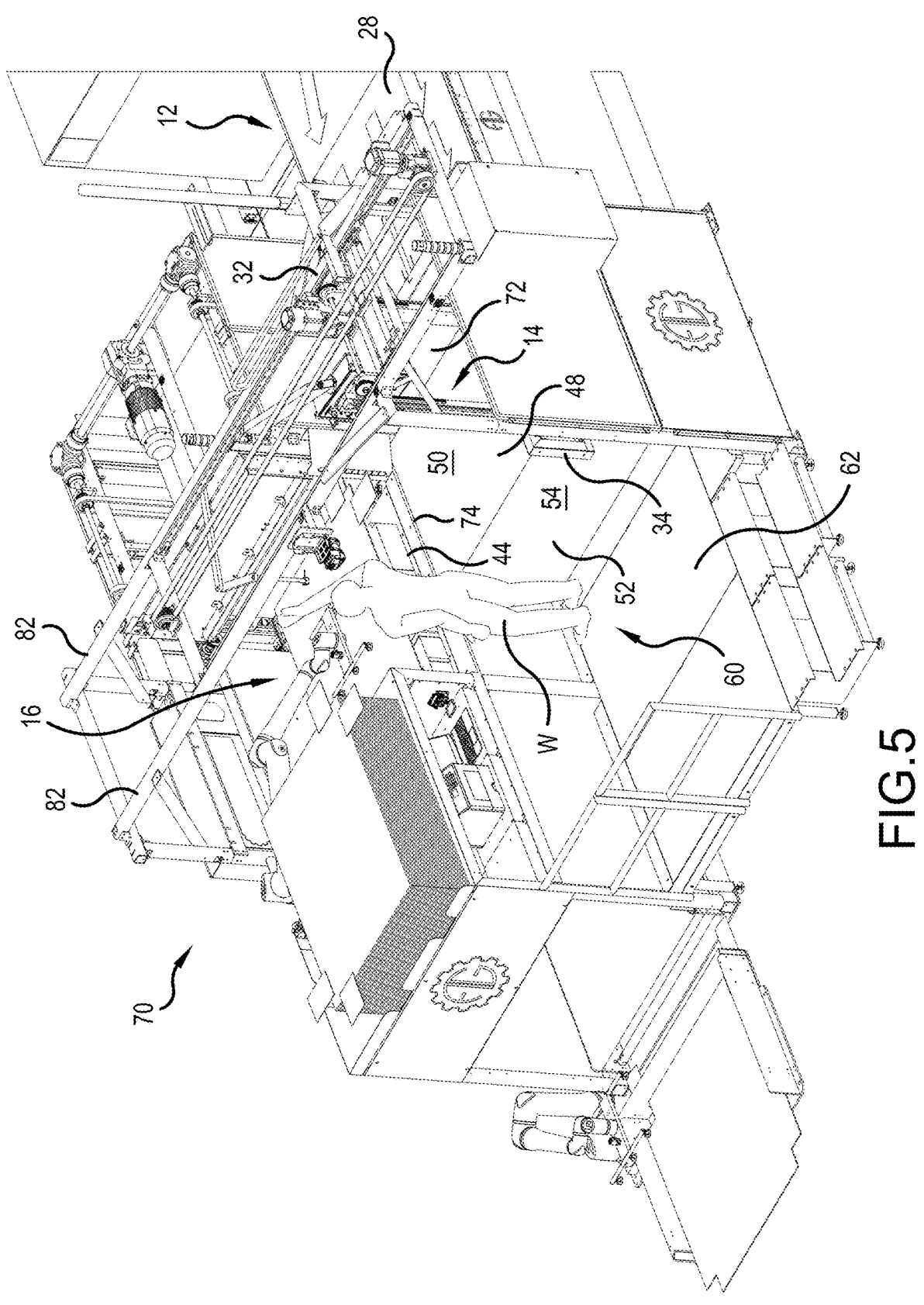
FIG. 5 is a perspective view of the load forming system of FIG. 3 configured for worker-assisted operation.

In the load forming system 10 of FIGS. 1 and 2, the feed conveyor 12 is located on the same side of the transfer platform 14 as the worker platform 62. FIGS. 3-5 show a second embodiment of a load forming system 70 in which the feed conveyor 12 is located on the opposite side of the transfer platform 14 from the worker platform 62. Elements common to both embodiments are identified with the same reference numerals.

In the load forming system 70, the feed conveyor 12 has a discharge edge 72 that is perpendicular to the input edge 44 of the cookie sheet 18. The first edge 74 of the transfer platform 14 is also perpendicular to the input edge 44 of the cookie sheet 18. When the gate 26 is lowered, bundles, arranged in a desired pattern, are pushed onto the transfer platform 14 by the end conveyor 28.

Like the load forming system 10 discussed above, the transfer platform 14 of the load forming system 70 could have a smooth upper surface or be formed as an air table. However, in this configuration (with the feed conveyor 12 on the opposite side of the transfer platform 14 from the workspace 60), it is desirable for at least the first section 48 of the transfer platform 14 to include a conveyor to help move a patterned layer of bundles B into a desired position in front of the contact body 34 from which position the patterned layer of bundles B can be shifted onto the cookie sheet 18 by the shifter 32. Furthermore, to reduce friction between the transfer platform 14 and the bundles, it is preferably to use an air table conveyor 210 of the type discussed below as the transfer platform 14 in this embodiment.

Figure 6:
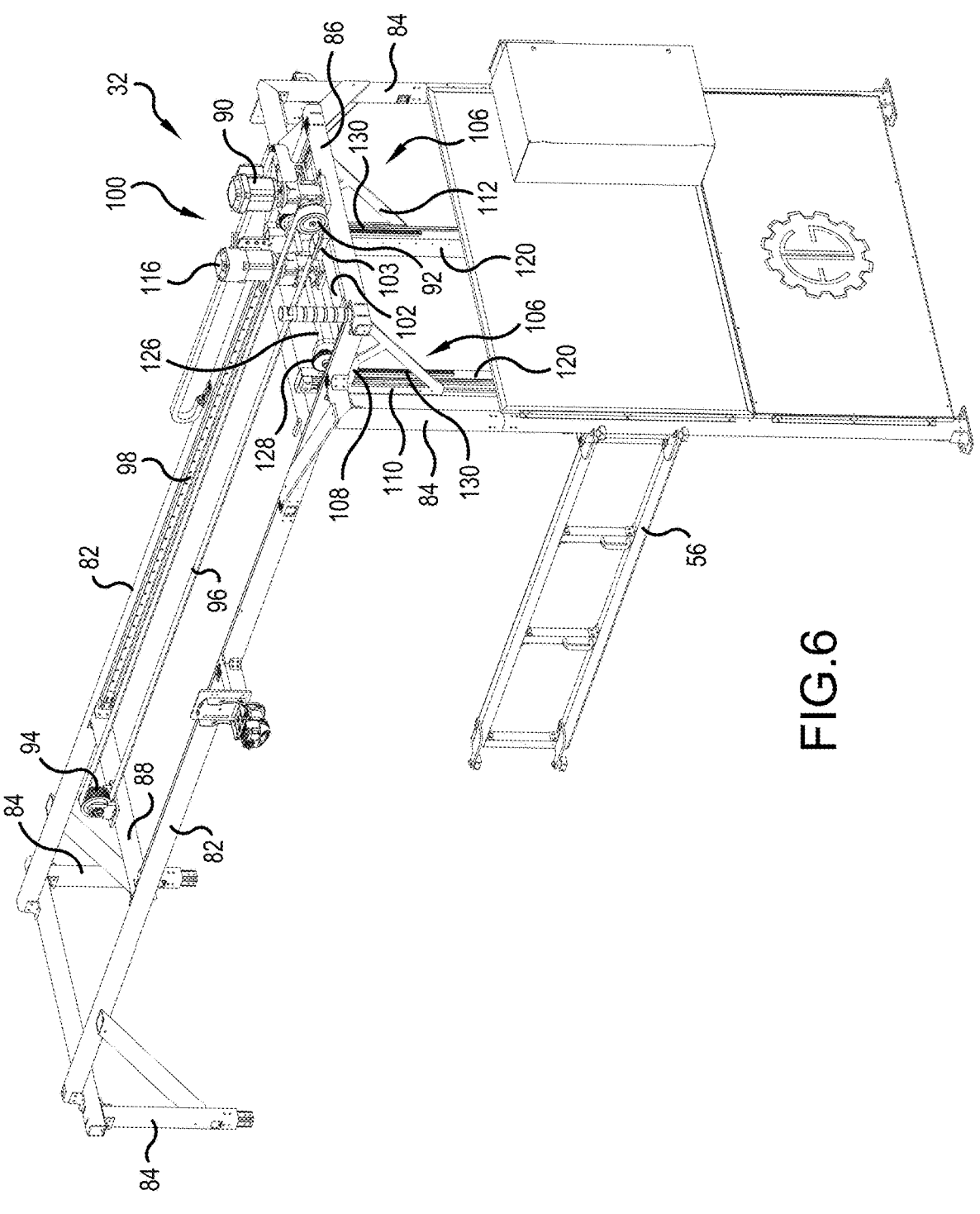
FIG. 6 is a first perspective view of a shifting mechanism usable in a load forming system according to embodiments of the present disclosure.
Figure 7:
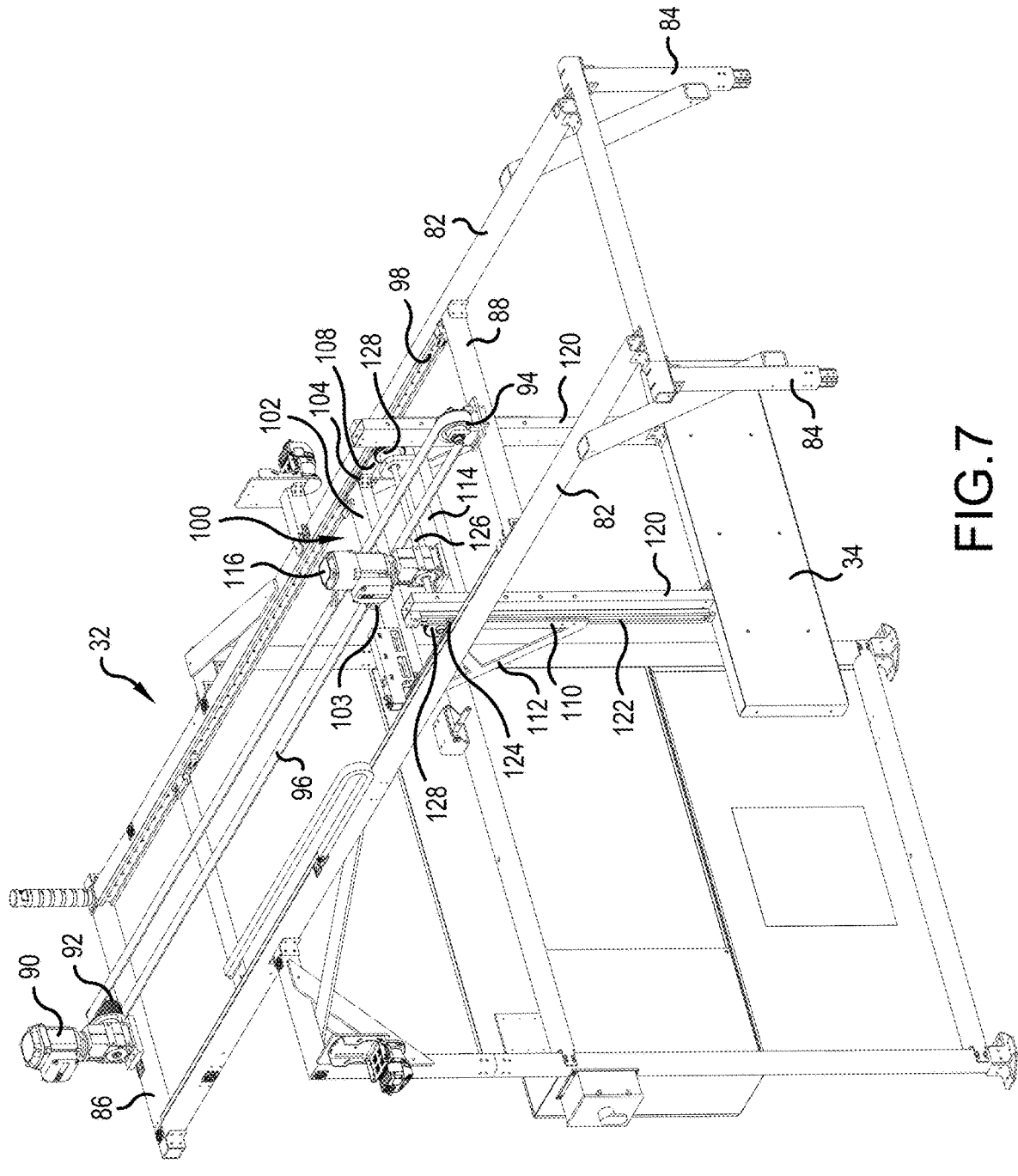
FIG. 7 is a second perspective view of the shifting mechanism of FIG. 7.

FIGS. 6 and 7 show the shifter 32 in greater detail. The shifter 32 includes a two horizontal rails 82 that extend above the end conveyor 28, the transfer platform 14 and the load former 16 in the load former system 10 of FIGS. 1 and 2, and above the transfer platform 14 and the load former 16 in the load former system 70 of FIGS. 3-5. The rails 82 are connected by a first horizontal member 86 and a second horizontal member 88. A belt drive 90 is mounted on the first horizontal member 86 and is operably connected to a drive wheel 92; a second wheel 94 is mounted on the second horizontal member 88, and a belt 96 is supported by the drive wheel 92 and the second wheel 94 such that it can be driven in forward and reverse directions by the belt drive 90. The belt drive 90 includes an absolute encoder to determine the position of the drive wheel 92 and thus the position of the carriage 100 along the rails 82. The belt 96, for example, may include a plurality of inwardly facing teeth that engage with corresponding teeth on the drive wheel 92 and the second wheel 94 so that the belt 96 can be driven without slippage.

A C-channel 98 is mounted on each of the mutually inwardly facing sides of the rails 82, and a carriage 100, which supports the contact body 34 as discussed below, is supported by the rails 82 for movement along the rails 82. The carriage 100 includes a main frame member 102 connected between bearing elements 104 that are slidably mounted in the C-channels 98. The carriage 100 is movable from a first position in which the contact body 34 is located on a side of the transfer platform 14 opposite the load former 16, shown for example, in FIG. 4, where it does not interfere with the movement of bundles B from the feed conveyor 12 to the load former 16, to a second position in which the contact body 34 is located near the input edge 44 of the cookie sheet 18. The belt 96 is clamped to the main frame member 102 by a block 103 so that the main frame member 102 and the carriage 100 can be slid toward and away from the load former 16 by the operation of the belt drive 90.

A truss 106 is attached to each end of the main frame member 102 and includes a horizontal leg 108 extending adjacent to each of the C-channels 98, a vertical leg 110 and a diagonal leg 112 connecting the vertical leg 110 to the horizontal leg 108. A motor support 114 also extends between the trusses 106 and supports a lift motor 116.

The contact body 34 is connected to the carriage 100 by two vertical arms 120, each of which includes a C-channel 122 (only one of which is visible in FIG. 7) facing toward the vertical legs 110 of the trusses 106. Projections 124 on the trusses 106 extend into the C-channels 122 to guide the vertical legs 110 for vertical movement. A drive shaft 126 is driven by the lift motor 128 and includes a pinion 128 at each end which pinions 128 engages a rack 130 on each of the vertical arms 120.

Figure 8:
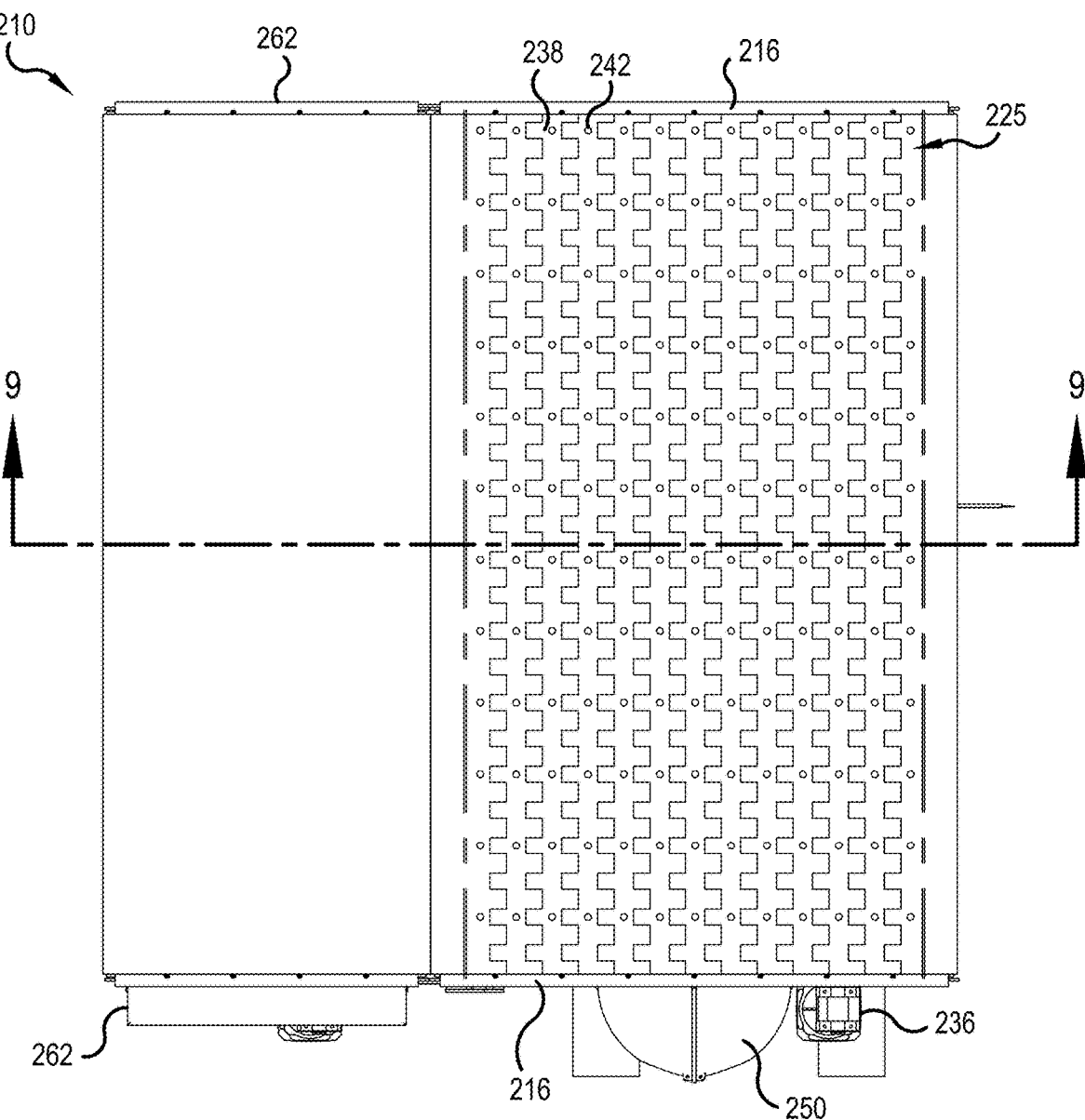
FIG. 8 is a top plan view of a first embodiment of an air table conveyor that can be used as the transfer platform of a load forming system according to embodiments of the present disclosure.
Figure 9:
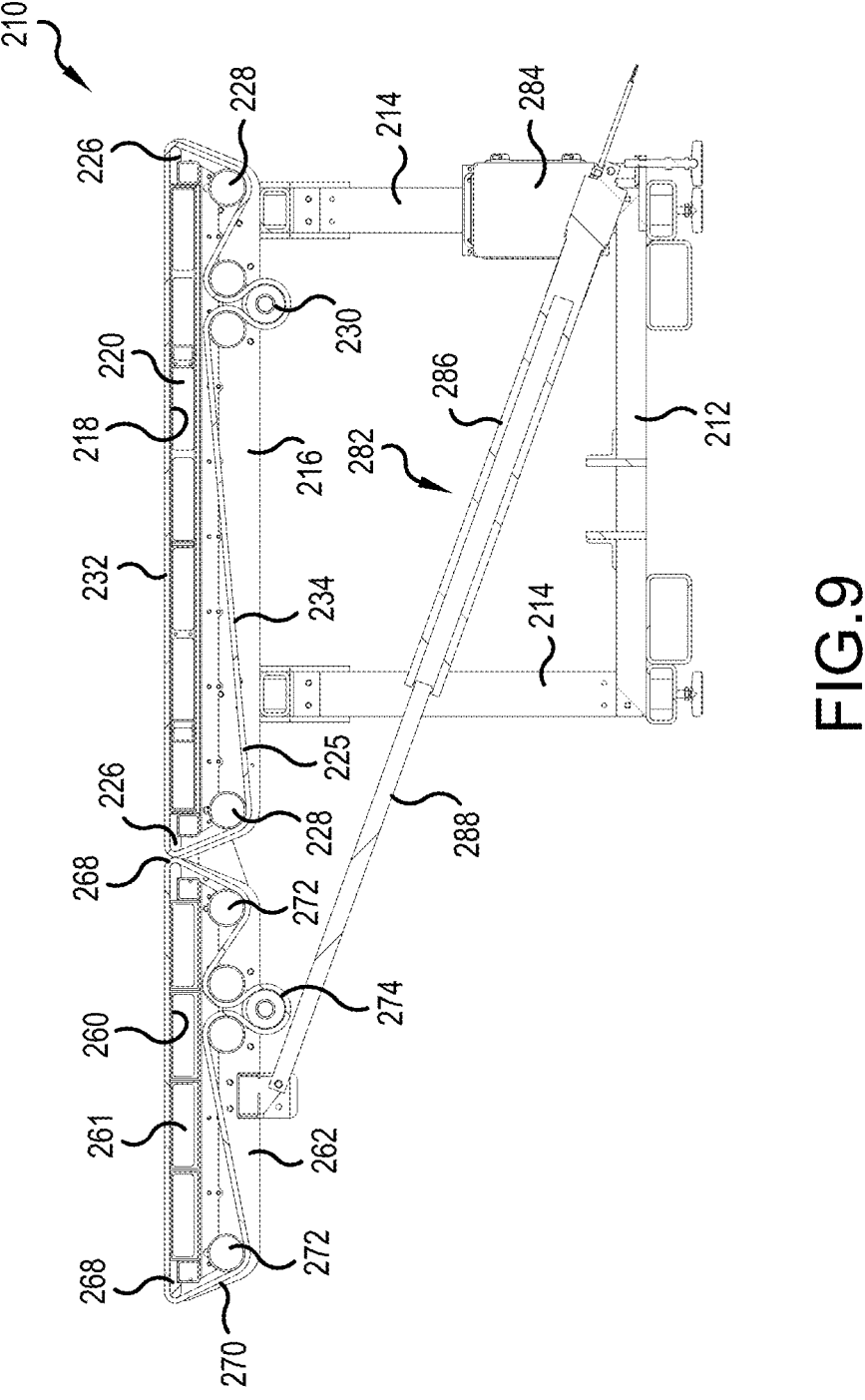
FIG. 9 is a sectional elevation view taken along line 9-9 in FIG. 8.
Figure 10:
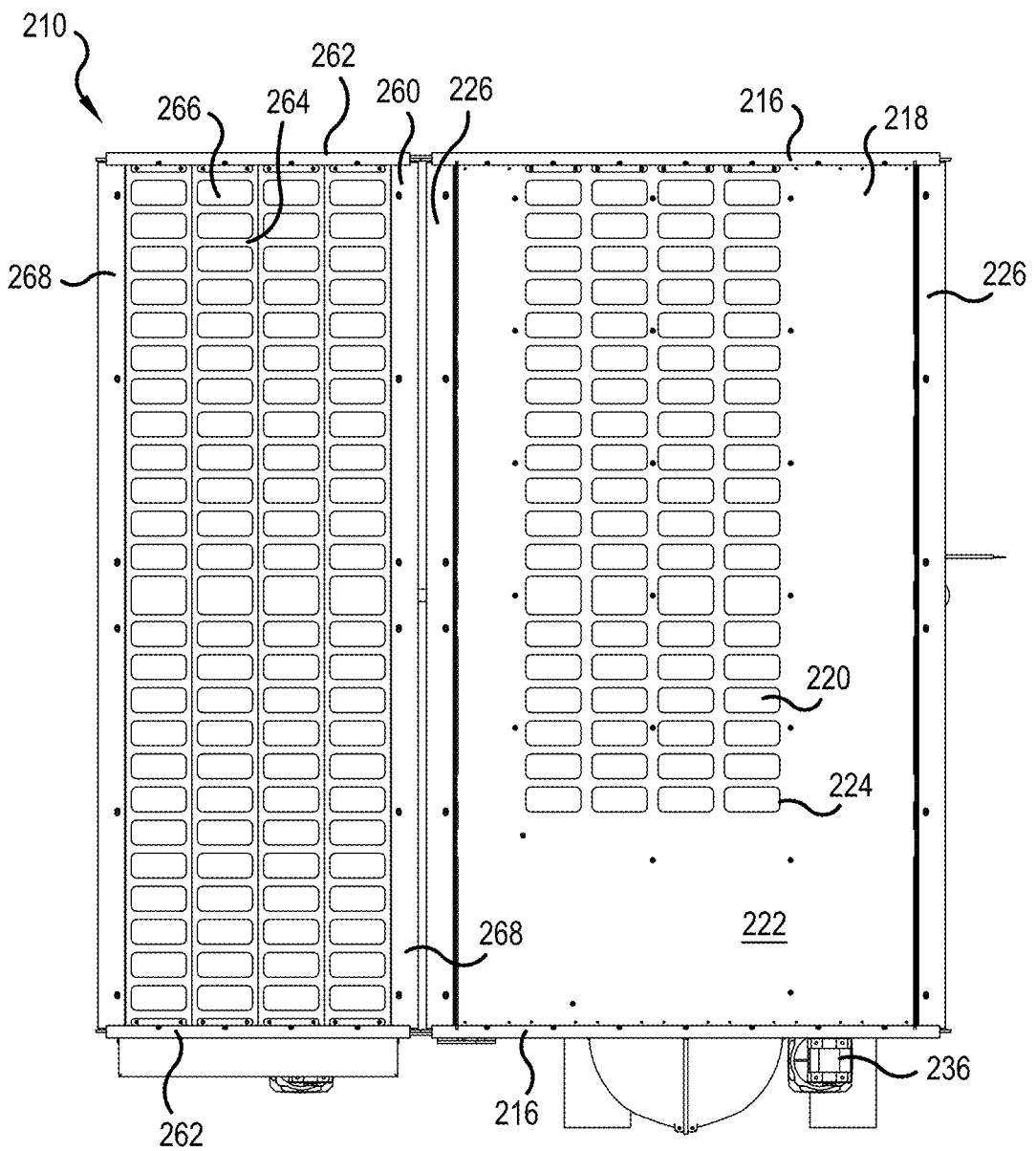
FIG. 10 is a top plan view of the conveyor of FIG. 8 with belts removed to show the structure of the support surfaces of the platform beneath the belt.

FIGS. 8-10 show a conveyor 210 suitable for use as the transfer platform 14 discussed above, especially in connection with the load former system 70 of FIGS. 3-5. The conveyor 210 includes a frame 212 having vertical supports 214 and upper side supports 216. A first platform 218 is supported between the upper side supports 216 which platform 218 has a hollow interior 220 and an upper surface 222 having a plurality of holes 224 in fluid communication with the hollow interior 220.

As used herein, direction terms such as "upper," "lower," "above," and "below," refer to the orientation of the conveyor 210 shown in, e.g., FIG. 9, with the frame supported by a floor, the upper surface 222 extending substantially horizontally and the vertical supports 214 extending substantially vertically.

A segmented first belt 225 extends across the upper surface 222 of the first platform 218 and around radiused ends 226 of the first platform 218 to first and second end rollers 228 that extend between the upper side supports 216.

The first belt 225 also extends around a drive roller 230 beneath the first platform 218 which drive roller 230 drives the first belt 225 around the first platform 218 and the end rollers 228. An upper run 232 of the first belt 225 is supported by the upper surface 222 of the first platform 218 and a lower run 234 of the first belt 225 guided beneath the first platform 218 by the end rollers 228 and the drive roller 230. A first belt drive 236 is operatively connected to the first drive roller 228 and is configured to rotate the first drive roller 228 to cause the first belt 225 to travel around the first platform 218.

Figure 15:
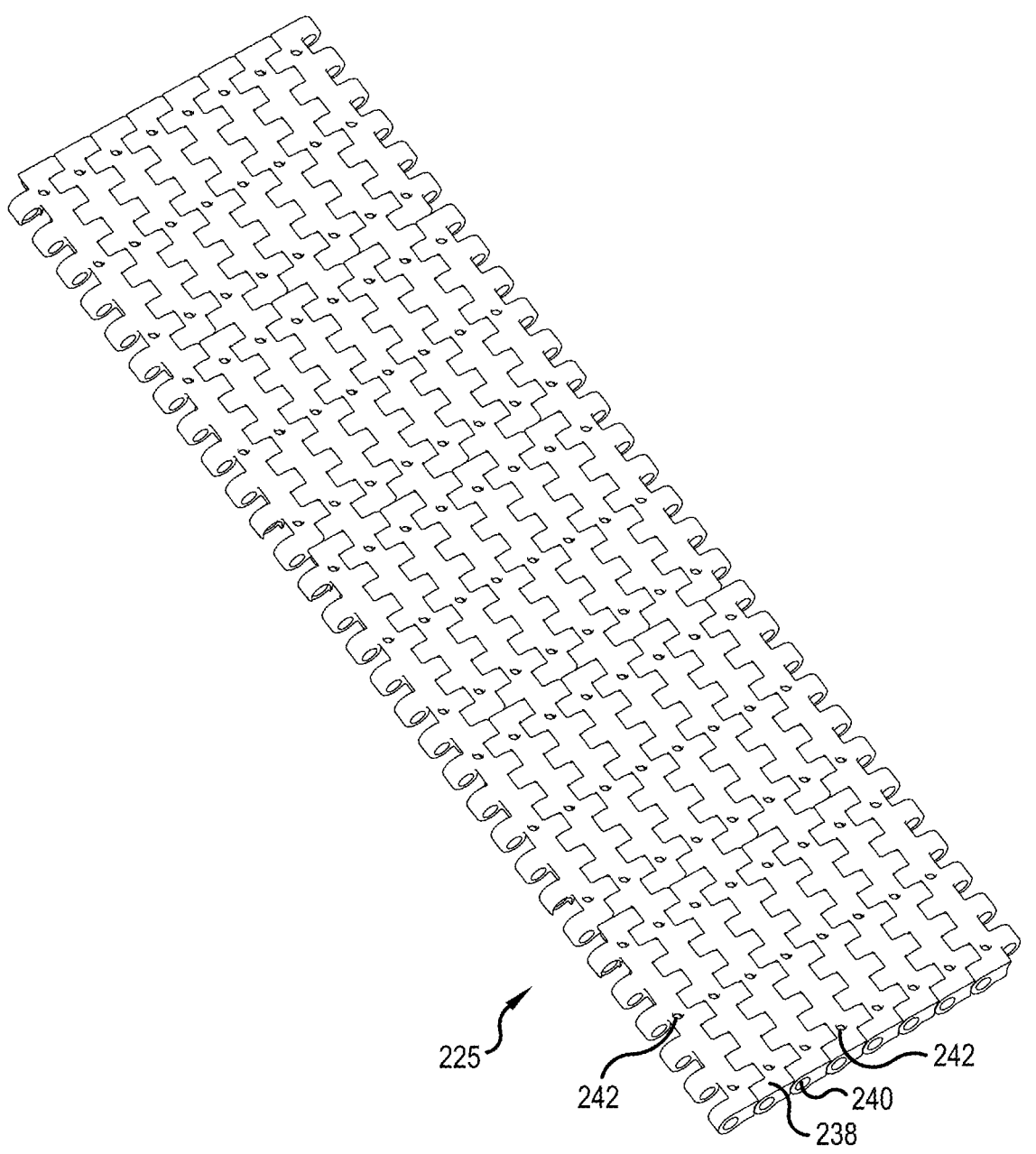
FIG. 15 is a perspective view of a section of the belt of the conveyor of FIG. 8.

The first belt 225, a section of which is shown in FIG. 15, includes a plurality of rigid sections 238 that are hingedly connected by pins 240 so that the first belt 225 can bend as it travels around the first platform 218, the end rollers 228 and the drive roller 230. The first belt 225 also includes a plurality of through openings 242 that allow air to exit the hollow interior 220 of the first platform 218 through the first belt 225. A suitable belt is available from Ammeraal Beltech of Skokie, IL under the series name uni M-QNB of belt type "vacuum."

The first platform 218 may be formed from upper and lower sheets of metal 244 with suitable supports 246 therebetween to provide structural support and allow the upper sheet of metal 244 to support loads during use of the conveyor 210 as discussed hereinafter. Other configurations of the first platform 218 are possible as long as the first platform 218 has one or more hollow interior chambers for receiving and guiding pressurized air to a plurality of holes in an upper surface of the first support and an upper surface suitable for guiding and supporting the first belt 225 and a load carried by the first belt 225.

The structure of the end rollers 228 and the drive roller 230 will depend on the nature of the first belt 225. In many cases, the "rollers" are actually shafts having sprockets mounted thereon for engaging corresponding openings in the interior of the first belt 225 to positively engage and drive the first belt 225. As used herein, the term "roller" refers to cylindrical rollers as well as to shafts having sprockets or shafts having pulleys of the type conventionally used to support one or more belts for movement along a closed path.

Figure 11:
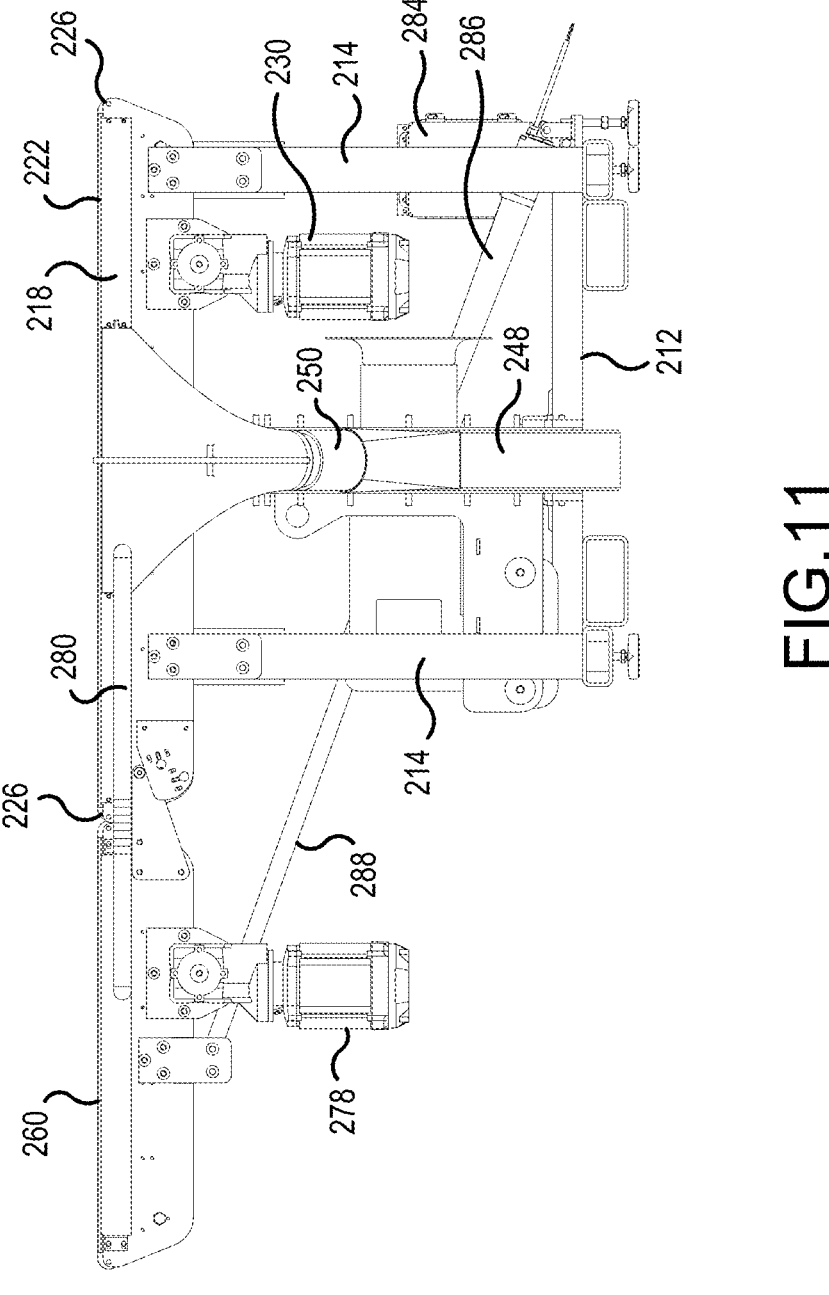
FIG. 11 is a side elevational view of the conveyor of FIG. 8.
Figure 12:
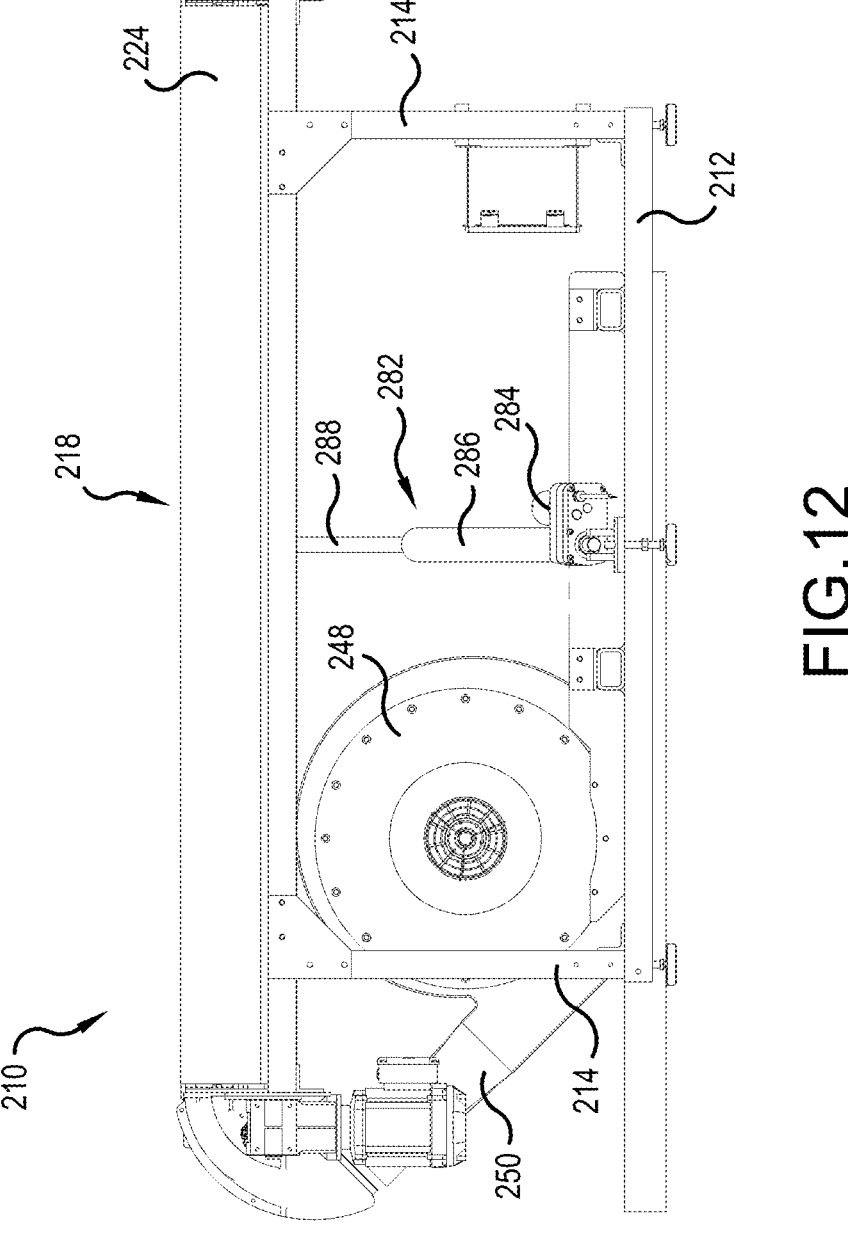
FIG. 12 is an end elevational view of the conveyor of FIG. 8.
Figure 13:
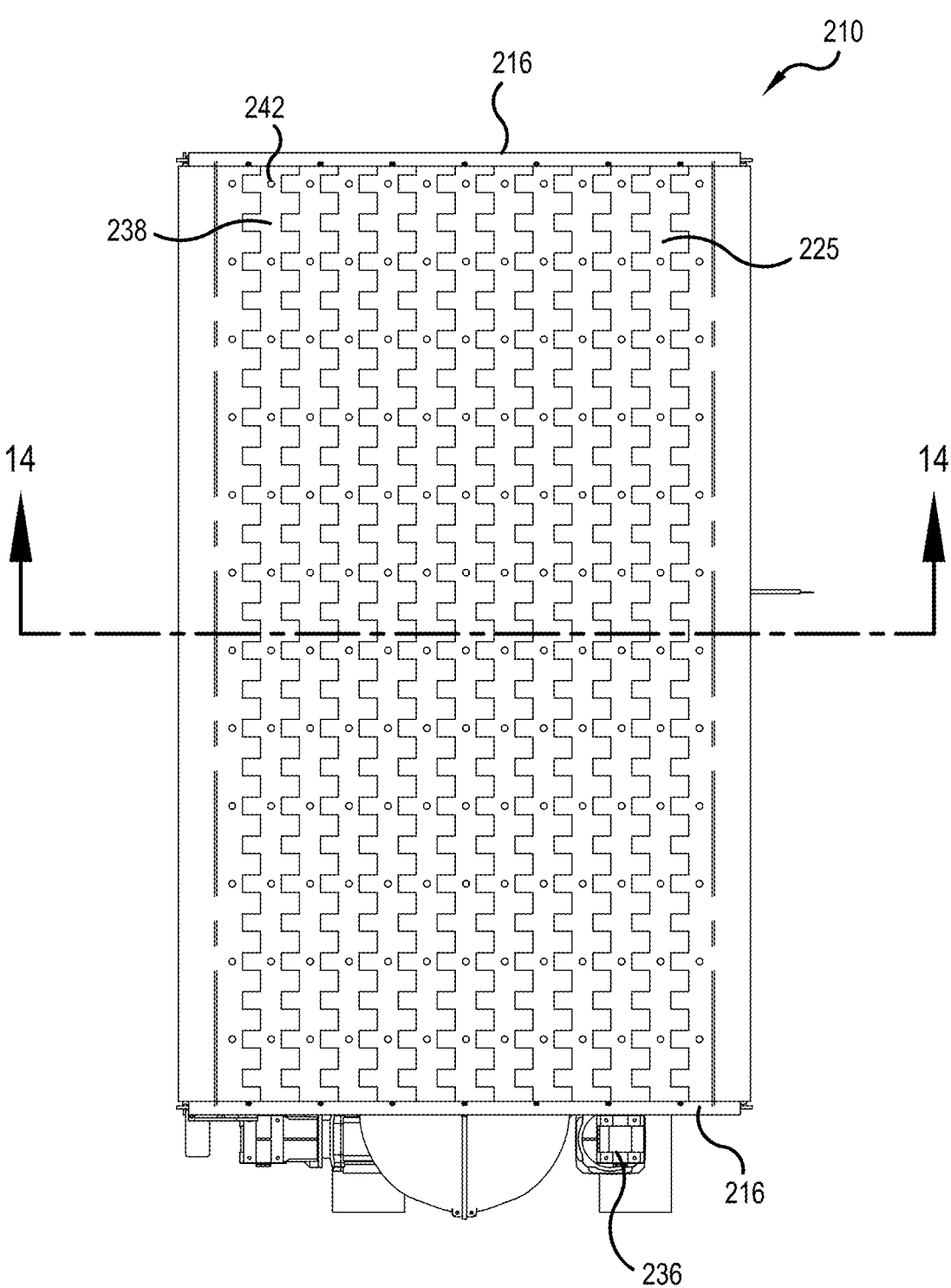
FIG. 13 is a top plan view of the conveyor of FIG. 8 with an extension portion of the conveyor in a lowered position.

A blower 248 (FIGS. 11 and 12) is connected to the hollow interior 220 by a duct 250 such that operating the blower 248 forces air into the hollow interior 220 and out of the plurality of holes 224 in the upper surface 222 of the first platform 218.

The first belt 225 overlies and blocks or substantially restricts air flow through the holes 224 in the upper surface 222 of the platform 218. While some air may leak out from under the edges of the first belt 225 or between the rigid sections 238, enough air will pass through the through-openings 242 in the first belt 225 to form jets of air extending upwardly from the upper run 232 of the first belt 225. Due to the restricted paths for air to escape from the hollow interior 220, the pressure in the hollow interior 220 is increased to a level above ambient by the blower 248. The air pressure in the hollow interior 220 is preferably maintained between about 1.5 inches of water column (iwc) and 5.0 iwc, during use and most preferably at about 2.5 iwc. This pressure level has been found to provide an adequate amount of lift for bundles B on the first belt 225 while at the same time not separating the first belt 225 from the upper surface 222 of the first platform to an excessive degree.

Each of the through-openings 242 has a cross-sectional area and each of the holes 224 has a cross-sectional area. Preferably, a sum of the cross sectional areas of the through-openings 242 in a portion of the upper run 232 of the first belt overlying the upper surface 222 of the first platform 218 is less than two percent, and more preferably less than one percent, of a sum of the cross sectional areas of the holes 224.

As shown in FIG. 10, in order to allow for the use of a smaller blower 248 and/or to limit air flow to the most frequently used portion of the first platform 218, the holes 224 may not cover the entire upper surface 222 of the first platform 218. In this manner, only a portion of the first platform 218 will provide a lift table function. For example, in the embodiment of FIG. 5, it is only necessary for the worker W to shift bundles from approximately the center of the first platform 218 toward the load former 16. Therefore, holes 224 are not provided on the side of the first platform 218 opposite the load former 16. This is because the air table function may be most helpful to the worker W when the load forming system 10, 70 is operated in the worker-assisted configuration and not as necessary when bundles are moved across the first platform 218 by the shifter 32 in the automated configuration. Of course, in situations where it is necessary to move bundles off the first platform 18 in either direction, the entire upper surface 222 of the first platform 220 can be provided with the holes 224.

Figure 14:
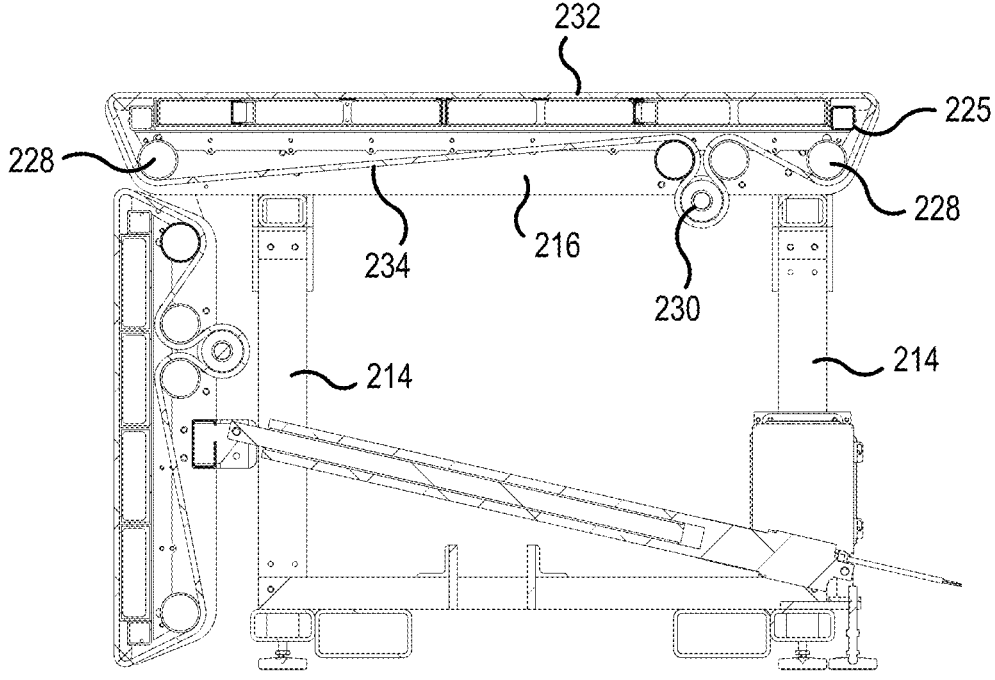
FIG. 14 is a sectional elevation view taken along line 14-14 in FIG. 13.

The conveyor 210 also includes a second platform 260 pivotably connected to one end of the first platform 218 that is shiftable between a raised position, as shown for example in FIG. 9, and a lowered position as shown, for example in FIG. 14. The second platform 260 is mounted between and supported by first and second side frame members 262. The second platform 260 is generally similar to the first platform and includes a hollow interior 261, an upper surface 264 having a plurality of holes 266 and radiused ends 268 configured to support sliding movement of a second belt 270 around the second platform 260 guided by first and second end rollers 272 and a drive roller 274 beneath the second platform 260. The second belt 270 includes a plurality of through openings 276, and a second drive 278 is operably connected to the drive roller 270.

A conduit 280 connects the duct 250, and thus the blower 248, to the interior 261 of the second platform 260 to pressurize the interior 216 of the second platform and form jets of air when air exits the holes 266 in the upper surface 264 of the second platform 260 and passes through the through openings 276 in the second belt 270.

In some cases, it may not be necessary to connect the second platform 260 to the blower 248. In those cases, the conduit 280 can be omitted, and the second belt 270 can be driven in the manner of a conventional conveyor without emitting jets of air. In a further alternative, the second platform could also omit the second belt 270 and the second drive 278 and function solely as a platform for receiving objects from the first belt 225 while the first platform 218 continues to provide an air table and/or conveyor functionality.

A telescoping actuator 282 is connected between the second platform 260 and the frame 212. The telescoping actuator includes a lift drive 284, a receiver 286 and an extendable member 288 that is extended from and retracted into the receiver 286 by the lift drive 284. Extending and retracting the extendable member 288 raises and lowers the second platform 260 relative to the first platform 218.

The operation of the load forming system 10 of FIGS. 1 and 2 when the transfer platform 14 comprises the air table conveyor 210 will now be described.

Bundles B arrive on the feed conveyor 12 from the output of a bundle breaker (not illustrated) or an upstream conveyor (not illustrated). The bundles B are moved downstream by the transport conveyor sections 17, rotated into a desired orientation by the rotating conveyor section 20, shifted laterally by the spreading conveyor section 22 and moved further downstream by the accumulating conveyor 24 until downstream movement is stopped when the bundles B impact against the gate 26 or against other bundles B that have previously come into contact with the gate 26. This may result in the pattern of bundles B in contact with the gate 26 as shown in FIG. 3.

When the desired arrangement of bundles B has been formed on the accumulating conveyor section 24, the gate 26 is lowered and the bundles B in the desired pattern are moved by the accumulating conveyor section 24 onto the end conveyor 28. The gate 26 is then raised, and the shifter 32 is actuated to move the contact body 34 into contact with the bundles B and slide the bundles B off the discharge edge 30 of the end conveyor 28 and onto the transfer platform 14.

Actuating the shifter 32 comprises operating the belt drive 90 to move the belt 96 to pull the carriage 100 along the rails 82 in the direction of the load former 16. Continued movement of the contact body 34 pushes the bundles B, still in the desired pattern, across the input edge 44 of the load former 16 and into position on the cookie sheet 18 of the load former 16. The load former 16 then cycles in a conventional manner, namely, the same way it would function if a human worker had placed the bundles in position on the cookie sheet 18.

After the contact body 34 arrives at the input edge 44 of the load former 16, the lift motor 116 is operated to rotate the drive shaft 126 and the pinions 128 at the ends thereof to lift the arms 120 and thus the contact body 34 away from the transfer platform 14. With the contact body 34 in a raised position, the belt drive 90 operates in a second direction to move the belt 96 to pull the contact body 34 away from the load former 16 and back to a starting or parked position out of the way of objects on the end conveyor 28. Raising the contact body 34 allows the contact body 34 to pass over any additional bundles B that have arrived on the end conveyor 28 while previous bundles B were being pushed onto the cookie sheet 18. The lift drive 126 is then operated to lower the contact body 34 back to a level in contact with or slightly above the end conveyor 28 so that it is ready to push the next layer of bundles B toward the load former 16.

When it is desired to operate the load forming system 10 of FIGS. 1 and 2 in a worker-assisted manner, the guard 56 is removed, and the second section 52 of the transfer platform 14 is lowered into its second position. This extends a workspace 60 to a location between the contact body 34 and the cookie sheet 18. Bundles B are then moved downstream along the feed conveyor 12 in a single line so that they can be grasped by the worker W, slid over the top surface 50 of the first section 48 of the transfer platform 14 by the worker W and into a desired position on the cookie sheet 18 of the load former 16. If the first section 48 of the transfer platform 14 comprises an air table, the air table function would be activated in this configuration to facilitate the movement of bundles B thereacross by the worker W. If the air table conveyor 210 of FIG. 8 is used as the transfer platform 14, the blower 248 could be operated to pressurize the interior 220 of the first platform 218 so that the air table conveyor 210 operates as an air table. The conveyor function of the air table conveyor 218 will not be used in this configuration.

Operation of the load forming system 70 of FIGS. 3-5 is similar to the operation of the load forming system 10 of FIGS. 1 and 2 described above. However, when the gate 26 is lowered, the layer of bundles B leaves the end conveyor 28 over the discharge edge 72 and moves directly onto the transfer platform 14. In this embodiment, the transfer platform 14 preferably comprises the air table conveyor 210 of FIGS. 8-14, and the controller 140 also controls the first belt 225 and if present, the second belt 270 of the air table conveyor 210 (as well as all other motors and operational elements discussed herein) to carry the layer of bundles B into a desired position in front of the contact body 34 of the shifter 32. Thus, the shifter 32 is not required to shift the bundles onto the transfer platform 14 but only to move the bundles B already present on the transfer platform 14 off the transfer platform 14 and onto the cookie sheet 18 by the worker W.

To use the load forming system 70 in the worker-assisted configuration with a worker W, the guard 56 is removed and the second section 52 of the transfer platform 14, that is the second platform 260 of the air table conveyor 210, is shifted into a second or lowered position either manually or by operation of the lift drive 284 of the telescoping actuator 282 retracting the extendable member 288 into the receiver 286. In this configuration, the first belt 225 is driven by the first drive 236 to bring the bundles, for example one at a time, toward the worker W in the workspace 60 while the blower 248 pressurizes the interior 220 of the first platform 218 of the air table conveyor to force air out through the through openings 242 of the first belt 225 reduce the weight of the bundle B on the first belt 225, for example, by at least 50 percent, to facilitate the sliding of the bundles B across the first belt 225 and onto the cookie sheet 18.

It will be appreciated that when the air table conveyor 210 is used in a system like the load forming system 210 of FIGS. 3-5, it is not necessary to provide the air table function at the side of the transfer platform 14 furthest from the load former 16 because bundles will generally arrive at the transfer platform 14 from the center of the feed conveyor 12 (to reduce the distance they must be moved by the worker W). Thus, the holes 224 in the upper surface 222 of the first platform 218 may be arranged as shown in FIG. 10 such that they do not extend across the entire upper surface 222 of the first platform 218.

The present invention has been described above in terms of presently preferred embodiments. Modifications and additions to these embodiments will become apparent to persons of ordinary skill in the art upon a reading of the foregoing disclosure. It is intended that all such modifications and additions form a part of the present invention to the extent they fall within the scope of the several claims appended hereto.

What is claimed is:

1. A conveyor comprising:
a frame;
a first platform mounted on the frame and having an upper surface, the upper surface having a plurality of first holes, each of the plurality of first holes being in fluid communication with at least one air passage inside the first platform;
a first belt having an upper run supported by the upper surface of the first platform and a lower run extending beneath the first platform, the first belt having a plurality of through openings overlying the first holes such that pressurized air exiting the at least one air passage through the first holes passes through the through openings in the first belt,
a drive for selectively causing the upper run of the first belt to travel along the upper surface of the first platform in a first direction, and a blower in fluid communication with the at least one air passage and configured to blow air into the at least one air passage to maintain a pressure in the at least one air passage at a level above an ambient atmospheric pressure,
wherein each of the through-openings has a cross-sectional area,
wherein each of the first holes has a cross-sectional area, and
wherein a sum of the cross sectional areas of the through-openings in a portion of the upper run of the first belt overlying the upper surface of the first platform is less than two percent of a sum of the cross sectional areas of the first holes.

2. The conveyor according to claim 1,
wherein the at least one air passage comprises a chamber defined by walls of the first platform.

3. The conveyor according to claim 1,
wherein the sum of the cross sectional areas of the through-openings in the portion of the upper run of the first belt overlying the upper surface of the first platform is less than one percent of the sum of the cross sectional areas of the first holes.

4. The conveyor according to claim 1,
wherein the drive comprises a drive shaft having a plurality of wheels or sprockets in contact with the lower run of the first belt and at least one driven shaft having a plurality of wheels or sprockets in contact with the lower run of the first belt.

5. The conveyor according to claim 4,
including a second platform mounted at an end of the first platform for pivotable movement relative to the first platform, the second platform having an upper surface.

6. The conveyor according to claim 5,
wherein the pressure is 1.5 iwc to 5.0 iwc.

7. The conveyor according to claim 1,
including a second platform mounted at an end of the first platform for pivotable movement relative to the first platform, the second platform having an upper surface.

8. The conveyor according to claim 1,
wherein the pressure is 1.5 iwc to 5.0 iwc.

9. A conveyor comprising:
a frame;
a first platform mounted on the frame and having an upper surface, the upper surface having a plurality of first holes, each of the plurality of first holes being in fluid communication with at least one air passage inside the first platform;
a first belt having an upper run supported by the upper surface of the first platform and a lower run extending beneath the first platform, the first belt having a plurality of through openings overlying the first holes such that pressurized air exiting the at least one air passage through the first holes passes through the through openings in the first belt,
a drive for selectively causing the upper run of the first belt to travel along the upper surface of the first platform in a first direction, and
a blower in fluid communication with the at least one air passage and configured to blow air into the at least one air passage to maintain a pressure in the at least one air passage at a level above an ambient atmospheric pressure,
wherein the drive comprises a drive shaft having a plurality of wheels or sprockets in contact with the lower run of the first belt and at least one driven shaft having a plurality of wheels or sprockets in contact with the lower run of the first belt.

10. A conveyor comprising:

a frame;

a first platform mounted on the frame and having an upper surface, the upper surface having a plurality of first holes, each of the plurality of first holes being in fluid communication with at least one air passage inside the first platform;

a first belt having an upper run supported by the upper surface of the first platform and a lower run extending beneath the first platform, the first belt having a plurality of through openings overlying the first holes such that pressurized air exiting the at least one air passage through the first holes passes through the through openings in the first belt, a drive for selectively causing the upper run of the first belt to travel along the upper surface of the first platform in a first direction, a blower in fluid communication with the at least one air passage and configured to blow air into the at least one air passage to maintain a pressure in the at least one air passage at a level above an ambient atmospheric pressure, and a second platform mounted at an end of the first platform for pivotable movement relative to the first platform, the second platform having an upper surface.

11. The conveyor according to claim 10, wherein an end of the second platform is pivotably supported by the frame for pivotably movement from a first position in which an upper surface of the second platform forms a continuation of the upper surface of the first platform and a second position in which the upper surface of the second platform is substantially perpendicular to the upper surface of the first platform.

12. The conveyor according to claim 10, including a second belt having an upper run supported by the upper surface of the second platform and a lower run extending beneath the second platform, and second drive for selectively causing the upper run of the second belt to travel along the upper surface of the second platform.

13. The conveyor according to claim 12, including an actuator for shifting the second platform from the first position to the second position.

14. The conveyor according to claim 13, wherein the upper surface of the second platform has a plurality of second holes, each of the plurality of second holes being in fluid communication with at least one air passage inside the second platform, and wherein the second belt has a plurality of through openings overlying the second holes such that pressurized air exiting the at least one air passage inside the second platform through the second holes passes through the through-openings in the second belt.

15. A method comprising:

providing a conveyor comprising:

a frame;

a first platform mounted on the frame and having an upper surface, the upper surface having a plurality of first holes, each of the plurality of first holes being in fluid communication with at least one air passage inside the first platform;

a first belt having an upper run supported by the upper surface of the first platform and a lower run extending beneath the first platform, the first belt having a plurality of through openings overlying the first holes such that pressurized air exiting the at least one air passage through the first holes passes through the through openings in the first belt;

a drive for selectively causing the upper run of the first belt to travel along the upper surface of the first platform in a first direction; and a blower in fluid communication with the at least one air passage and configured to blow air into the at least one air passage to maintain a pressure in the at least one air passage at a level above an ambient atmospheric pressure, operating the blower to blow air into the at least one air passage to maintain the pressure in the at least one air passage at the level above the ambient atmospheric pressure and cause air to exit the at least one air passage through the plurality of first holes and pass through the first through-openings in the first belt, and operating the drive to cause the upper run of the first belt to travel along the upper surface of the first platform in the first direction while air exits the at least one air passage through the plurality of first holes and passes through the first through-openings in the first belt, placing an object having a weight and a substantially flat bottom on the upper run of the first belt, and operating the blower to maintain the pressure in the at least one air passage to create an airflow rate through the plurality of through-openings in the first belt sufficient to reduce a proportion of the weight of the object supported by the first belt by at least 50%.

16. The method according to claim 15, wherein the object is a bundle of die-cut paperboard blanks.

17. The method according to claim 16, wherein the pressure is 1.5 iwc to 5.0 iwc.

18. The method according to claim 15, wherein the pressure is 1.5 iwc to 5.0 iwc.

* * * * *